June 1, 1971      M. GILVAR      3,581,368

SHEAR MECHANISM

Filed April 24, 1969      7 Sheets-Sheet 1

INVENTOR.
MARTIN GILVAR
BY
Chittick, Pfund Birch Samuels & Gauthier
ATTORNEYS

INVENTOR.
MARTIN GILVAR
BY
Chittick, Pfund, Birch, Samuels & Gauthier
ATTORNEYS

June 1, 1971 — M. GILVAR — 3,581,368
SHEAR MECHANISM
Filed April 24, 1969 — 7 Sheets-Sheet 5

INVENTOR.
MARTIN GILVAR
BY Chittick, Pfund, Birch, Samuels & Gauthier
ATTORNEYS

June 1, 1971  M. GILVAR  3,581,368
SHEAR MECHANISM

Filed April 24, 1969  7 Sheets-Sheet 7

INVENTOR.
MARTIN GILVAR
BY
Chittick, Pfund, Birch Samuels & Gauthier
ATTORNEYS ated June 1, 1971

3,581,368
SHEAR MECHANISM
Martin Gilvar, Westboro, Mass., assignor to Morgan Construction Company, Worcester, Mass.
Filed Apr. 24, 1969, Ser. No. 818,862
Int. Cl. B23p 19/04
U.S. Cl. 29—200          10 Claims

ABSTRACT OF THE DISCLOSURE

An apparatus for dividing and shearing a continuously descending helical formation of rings. The apparatus includes a generally cylindrical wall defining a chamber through which the rings descend under the influence of gravity. A plurality of circumferentially spaced intercepting pins move axially through the wall into the chamber to temporarily interrupt the descent of rings, with the rings above the intercepting pins thereafter being connected to the rings therebelow by at least one connecting strand. A horizontally movable gate and a pivotal arm then move into the path of ring descent at a level below that of the intercepting pins to confine the connecting strand within a restricted cross-sectional area of the chamber. The strand is then sheared between a blade on the pivotal arm and a second blade which moves through the chamber wall into the restricted area. Guide members movable with the second blade cooperate with the pivotal arm and the gate to locate the connecting strand between and in a generally transversally disposed position relative to the shear blades prior to the strand being sheared.

DESCRIPTION OF THE INVENTION

This invention relates generally to an apparatus of the type disclosed in U.S. Pat. No. 3,360,842 for dividing and shearing a continuously descending helical formation of rings, and more particularly to an improved means for properly positioning the element to be severed prior to the shearing action taking place.

In a shearing operation of the type herein contemplated, intercepting means are first employed to temporarily interrupt the descent of rings through the apparatus, with the rings above the intercepting means being thus connected to the rings accumulated in coil form therebelow by at least one connecting strand. The connecting strand is next positioned within the operative range of a shear mechanism and severed. The underlying coil is then removed, and the intercepting means thereafter withdrawn to allow continued operation of the apparatus.

Athough the use of known shear mechanisms in connection with the above-mentioned operation has met with some success, sporadic malfunctions have been encountered due to improper positioning of the connecting strand in relation to the shear blades and their associated guides. More particularly, it has been observed that where the intercepting means comprises a plurality of spaced members, such as for example axially movable pins, the location and attitude of the connecting strand will be governed by which of the several pins the strands depends from. If the connecting strand slopes down gradually between the shear blades, or if the strand is located to one side of the path of the movable shear blade, a malfunction may result due to the strand becoming wedged between the movable shear blade and its associated guides. With many modern high speed commercial operations, such as the handling of a product from a rolling mill, any interruption of this type is intolerable.

Accordingly, it is a general object of the present invention to obviate the aforementioned difficulties by providing means for insuring proper positioning of the connecting strand between the shear blades immediately prior to commencement of the shearing operation.

A further object of the present invention is to provide means for simultaneously controlling both the vertical attitude and lateral positioning of the connecting strand within the cutting range of a pair of shear blades.

These and other objects and advantages of the present invention will become more apparent as the description proceeds with the aid of the accompanying drawings in which.

Figure 16:
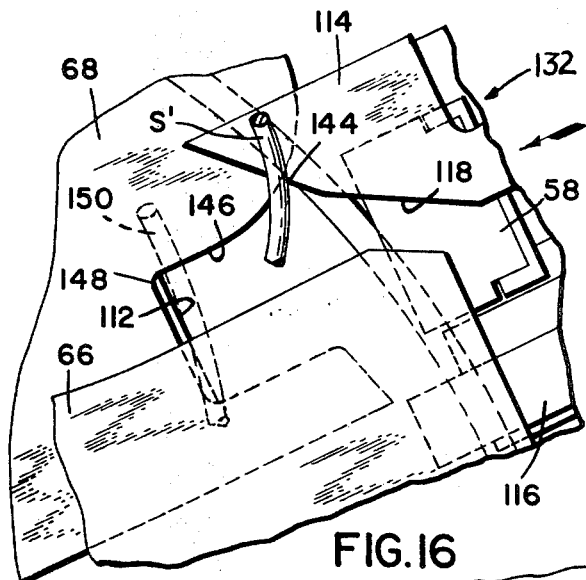
Figure 17:
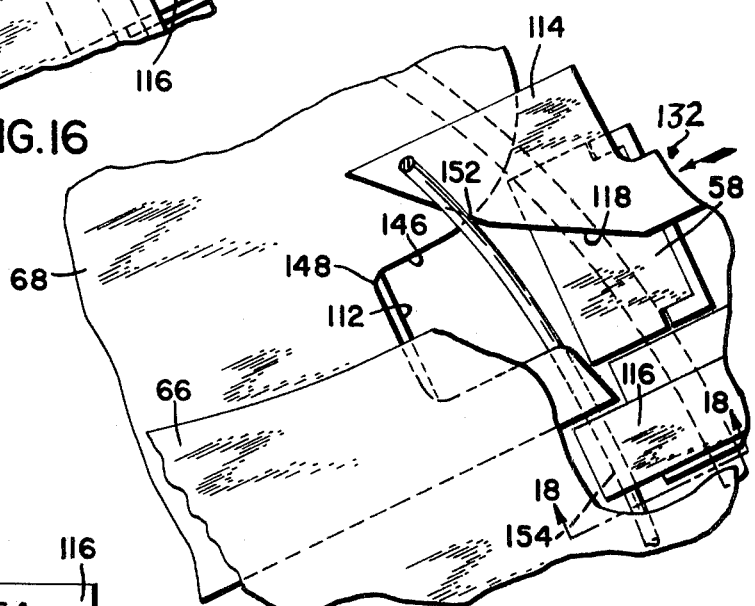
Figure 18:
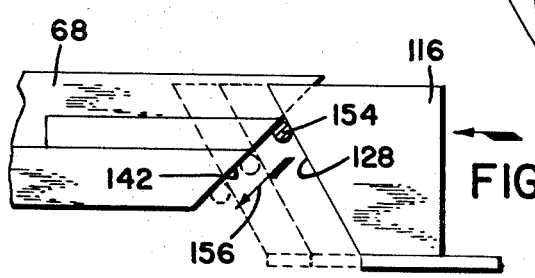
Figure 19:
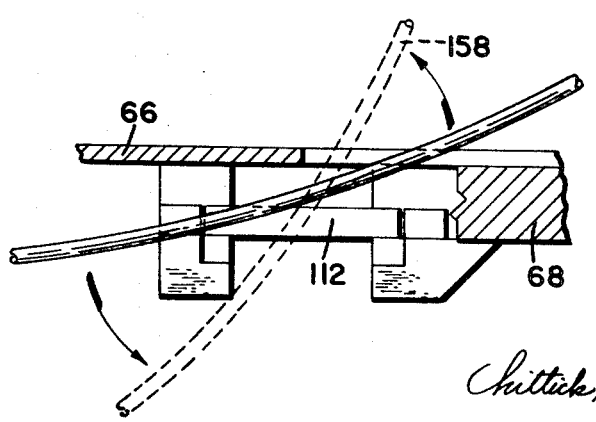

FIG. 16 is a view schematically depicting the locating function of one of the guide members when a connecting strand is initially vertically disposed in the corner of the restricted area defined by the gate member, the pivotal arm members and the chamber wall; and, FIGS. 17, 18 and 19 are schematic views showing the locating function of both guide members when dealing with a connecting strand sloping gradually through the restricted area.

Figure 1:
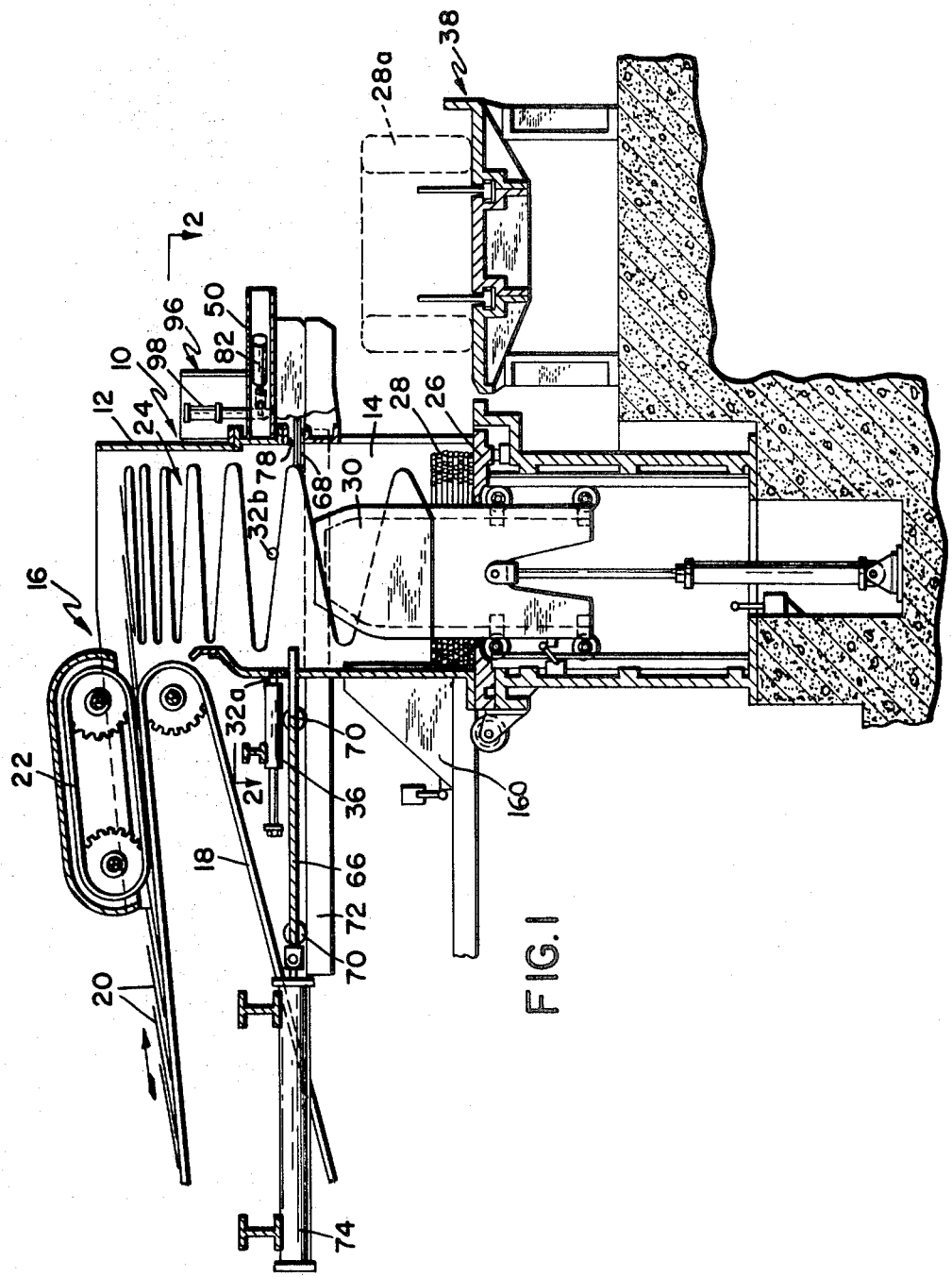
FIG. 1 is a sectional view on an apparatus employing the present invention taken along line 1—1 of FIG. 2.
Figure 2:
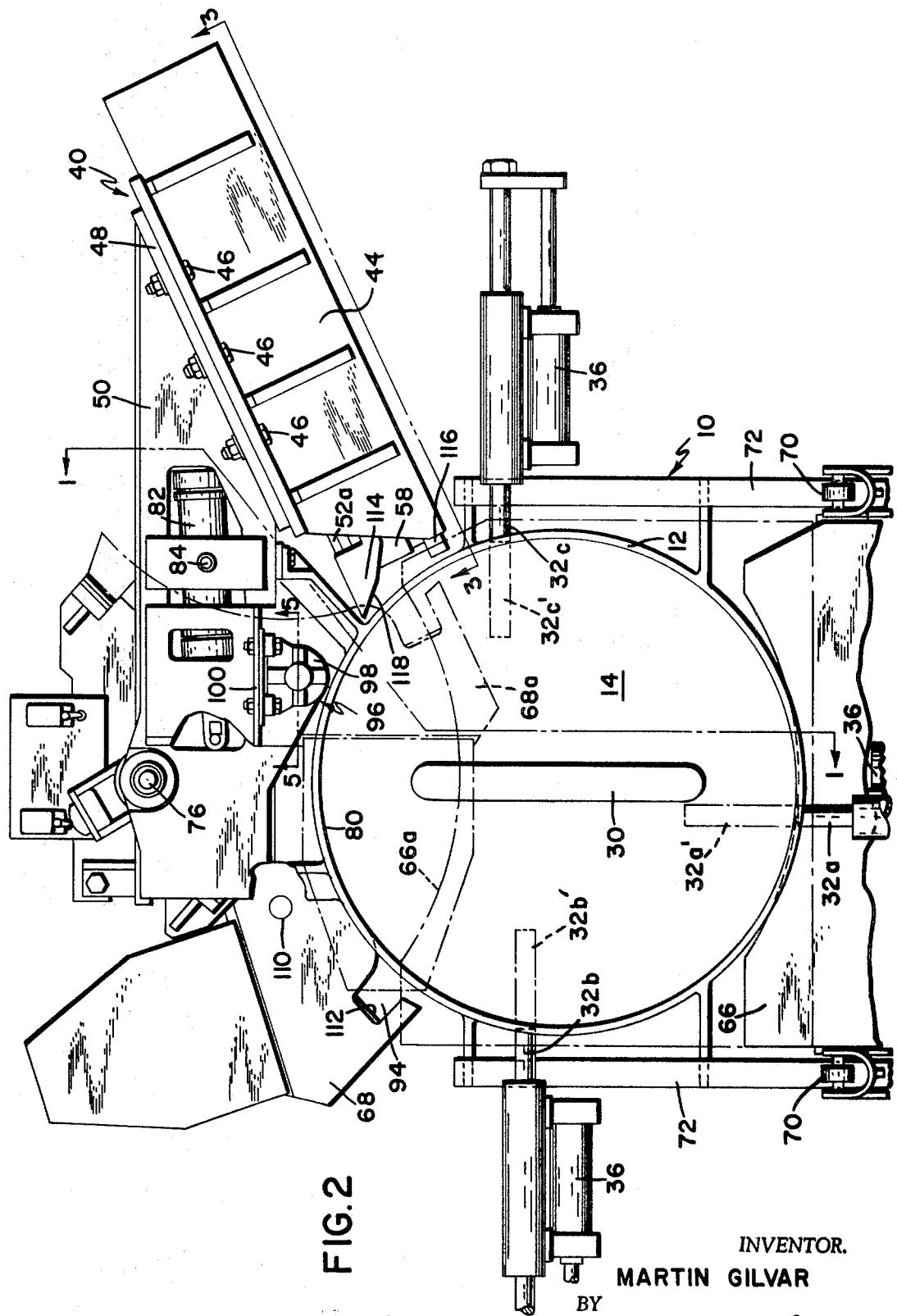
FIG. 2 is a sectional view on an enlarged scale taken along line 2—2 of FIG. 1.

Referring initially to FIGS. 1 and 2 wherein are best shown general features of an apparatus embodying the concepts of the present invention, there is shown a coil forming apparatus 10 which includes a generally cylindrical wall 12 defining a vertically extending chamber 14. The upper end of chamber 14 underlies the delivery end 16 of a conveyor 18 carrying rings 20 arranged in an overlapping non-concentric arrangement. The rings are gripped between the conveyor 18 and an overlying continuous chain conveyor 22 and are thus delivered to the chamber 14 in a substantially horizontal attitude. From this point the rings assume a helical formation generally indicated at 24 as they drop under the influence of gravity onto an underlying connecting table 26 where they accumulate in coil form as at 28. A centrally disposed guide plate commonly referred to as a "sail" 30 cooperates with the surrounding wall 12 in controlling the shape of the growing coil accumulating on tablet 26. It will of course be understood that the conveyors 18 and 22 are not part of the present invention, and that other means including but not limited to a conventional laying head may be employed to deliver rings to the apparatus 10.

When the coil 28 on table 26 reaches the desired size, continued descent of the rings through chamber 14 is temporarily interrupted by spaced members which in the embodiment herein disclosed, include axially movable intercepting pins 32a, 32b and 32c arranged around the chamber wall 12. The pins are axially advanced through the wall 12 into chamber 14 by means of fast acting pneumatic cylinders 36. When advanced to the operative positions indicated by broken lines at 32a', 32b', and 32c', the pins extend across the path of ring descent, thus temporarily interrupting the further descent of rings towards collecting table 26. Subsequent rings leaving the conveyor 18 will continue to accumulate on the operatively positioned intercepting pins, and these rings will be connected to the last ring on the underlying coil 28 by at least one connecting strand S (see FIG. 9).

Figure 3:
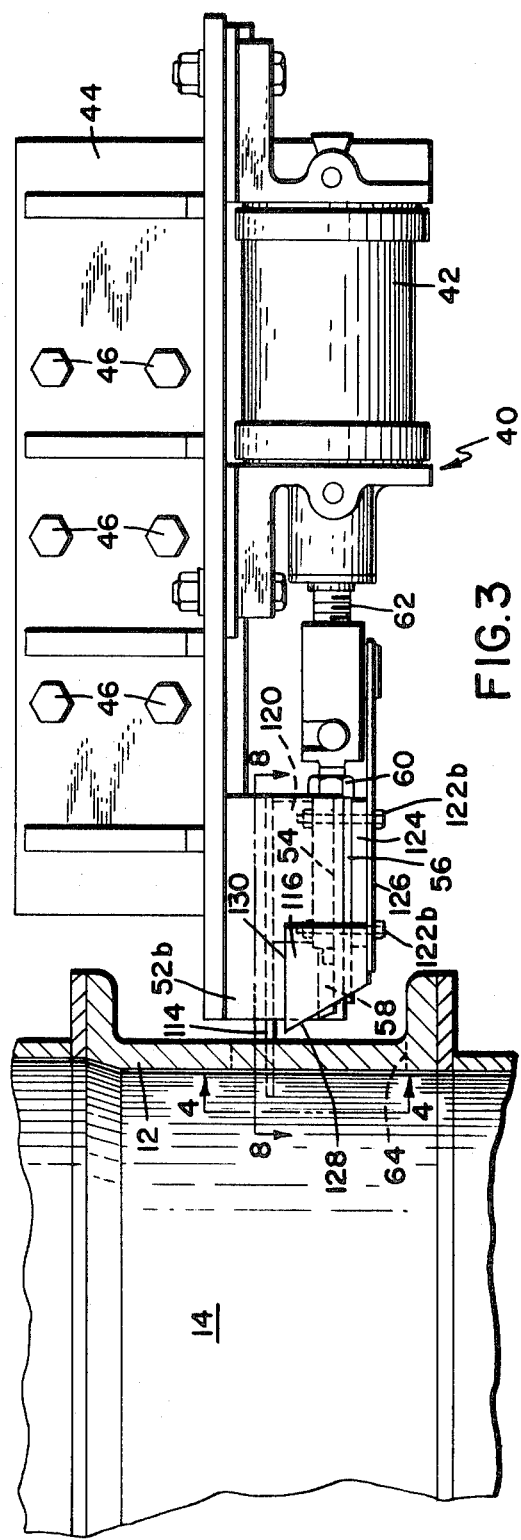
FIG. 3 is a still further enlarged view, partially in section, taken along line 3—3 of FIG. 2.
Figure 4:
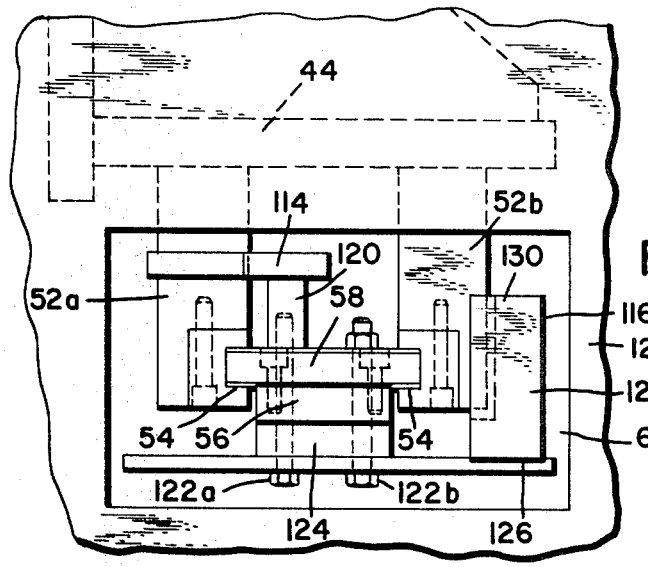
FIG. 4 is a front view of the movable knife assembly taken on line 4—4 of FIG. 3.

The next stage in the operation involves shearing the connecting strand S so that the underlying coil 28 can be removed from the collecting table 26 onto an adjacent horizontal conveyor 38. To this end, a shear mechanism generally indicated at 40 is mounted in a fixed location on one side of the chamber wall 12. As can be better seen by a combined reference to FIGS. 2, 3 and 4, shear mechanism 40 includes a cylinder 42 mounted on the underside of a support bracket 44 which is in turn attached by means of bolts 46 to an upstanding flange 48 on a horizontal platform 50 fixed exterior of the chamber wall 12. Bracket 44 is provided with a pair of depending spaced parallel guide members 52a and 52b which are grooved as at 54 to slidably support a blade holding element 56. A blade 58 is mounted on element 56, the latter being attached as at 60 to the piston rod 62 of cylinder 42. As will hereinafter be described more fully, when cylinder 42 is actuated, the blade holding element 56 and the blade 58 carried thereon are moved through an opening 64 in the chamber wall 12 into the chamber 14.

As previously indicated, the actual position and attitude of the connecting strand S in chamber 14 will be governed by which of the intercepting pins 32a, 32b or 32c the strand depends from. This relationship is impossible to predict with any degree of certainty, and accordingly, it becomes necessary to provide strand positioning means for locating the strand in the proper position and attitude for shearing. In the embodiment herein disclosed, the strand positioning means includes a horizontally movable gate member 66 and a pivotal arm member 68. The gate member 66 is supported exterior of the chamber 14 by means of wheels 70 which run along spaced tracks 72. The gate member is reciprocally operated through an opening in the chamber wall in a generally horizontal plane by any known means such as for example the cylinder 74 shown in FIG. 1. Gate member 66 travels between an inoperative withdrawn position as indicated by the solid lines in FIGS. 1 and 2, and an advanced operative position as shown by broken lines at 66a in FIG. 2.

Arm member 68 pivots about a vertical axis 76 through a slot 78 in the chamber wall. When the arm member is in its withdrawn inoperative position as shown by the solid lines in FIGS. 1 and 2, its forward curved edge 80 closes substantially the entire length of slot 78, thus preventing a leading product end from becoming snagged therein. The arm member 68 is operated in a plane beneath that of the gate member 66 between its inoperative position and the operative position shown by broken lines at 68a in FIG. 2 by means of a cylinder 82 which is itself pivotally mounted as at 84 on platform 50.

Figure 5:
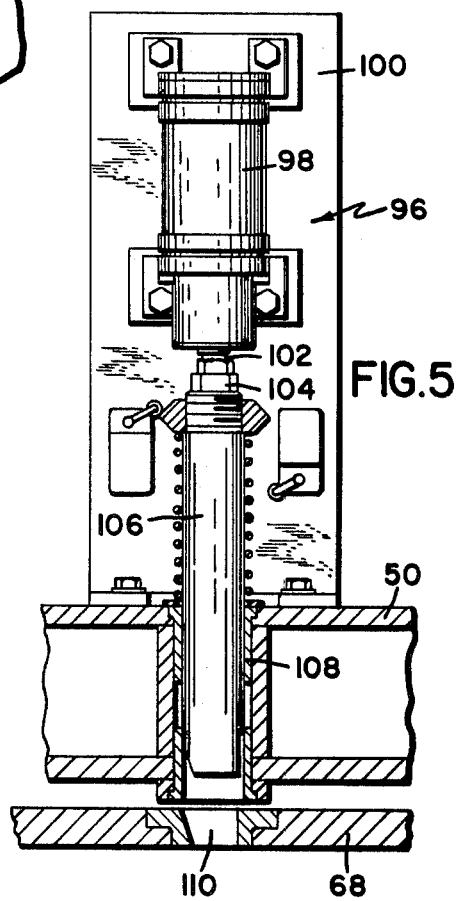
FIG. 5 is a sectional view showing the means employed to lock the pivotal arm in place taken along line 5—5 of FIG. 2.
Figure 9:
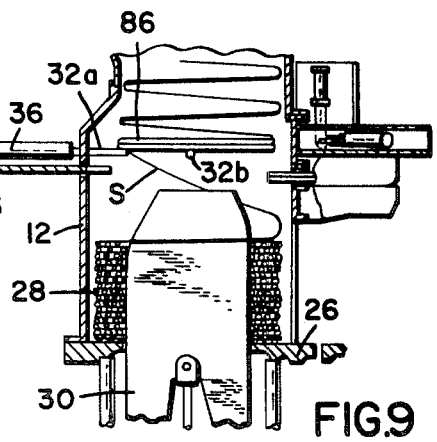
FIG. 9 is an illustration similar to FIG. 1 showing the apparatus immediately after the intercepting pins have been operatively positioned.
Figure 10:
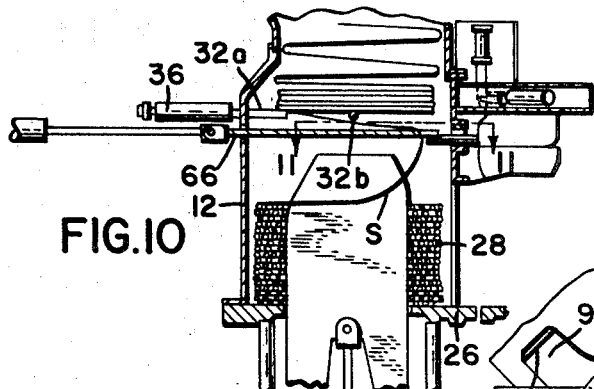
FIG. 10 is a view similar to FIG. 9 showing the apparatus immediately after the movable gate member has been operatively positioned.
Figure 11:
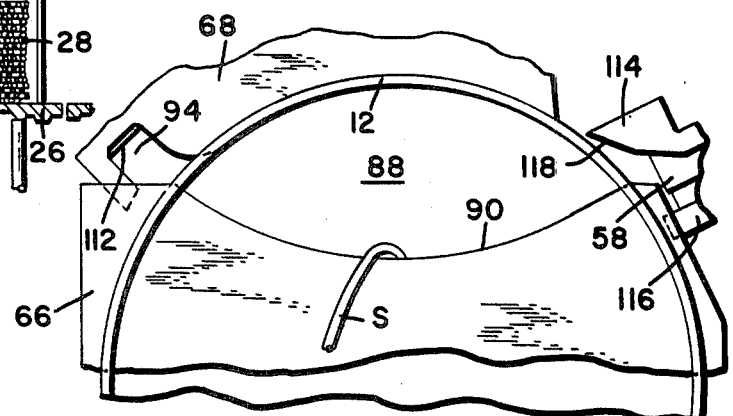
FIG. 11 is a sectional view on an enlarged scale taken along line 11—11 of FIG. 10.
Figure 12:
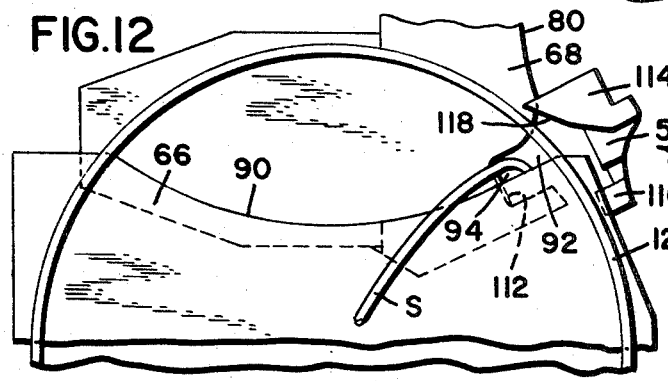
FIG. 12 is a view along the same line as FIG. 10 showing the apparatus after the pivotal arm member has been operatively positioned.

The function of the gate member 66 and arm member 68 can be best understood by further reference to the schematic illustrations contained in FIGS. 9 to 12. It will be understood that as soon as the coil 28 on table 26 has reached the desired size, the cylinders 36 are actuated to drive the intercepting pins 32a, 32b and 32c into the path of ring descent. This condition is illustrated in FIG. 9 wherein it can be seen that the rings continuing to temporarily accumulate as at 86 on the intercepting pins are connected to the underlying completed coil 28 by means of a connecting strand S. Although the connecting strand S is shown depending from intercepting pin 32a, it will be further understood that this relationship may vary each time the intercepting pins are actuated, and that accordingly, the strand S may depend from any one of the intercepting pins. As shown in FIGS. 10 and 11 the gate member 66 is next advanced to its operative position. This results in the connecting strand S being pushed into a somewhat oval space 88 bordered on one side by the chamber wall 12 and on the other side by the curved forward edge 90 of the gate member. Cylinder 82 is next actuated to pivot arm 68 to its operative position. The arm moves in a plane immediately beneath that of gate member 66, thus sweeping across space 88 with the result that as shown in FIG. 12, the connecting strand S is now further confined adjacent shear mechanism 40 within a restricted area 92 which is bordered by the wall 12 of the chamber, the forward edge 90 of gate member 66, and by the cutting notch 94 in the leading edge 80 of the pivotal arm. When thus positioned, a locking assembly 96 (see FIGS. 2 and 5) is actuated to lock arm member 68 in place prior to commencing the shearing operation. Locking assembly 96 includes a vertically disposed cylinder 98 mounted on a plate 100 extending upwardly from platform 50. The piston rod 102 of cylinder 98 is attached as at 104 to a locking pin 106, the latter being movable vertically through an opening 108 in platform 50 into a receiving aperture 110 in pivotal arm member 68. When the pin is driven downwardly into aperture 110, the arm 68 is locked in place in preparation for the strand shearing operation which will now be described.

The shearing of connecting strand S is accomplished by driving blade 58 through the opening 64 in chamber wall 12 towards blade 112, the latter being fixed to arm 68 at the base of cutting notch 94. Under ideal conditions, as shown in solid lines at S in FIGS. 6 and 7, the attitude of the connecting strand should be nearly vertical and the strand should lie against the edge of the cutting blade 112. In practice, however, as previously suggested, the attitude and position of the strand will be governed by a number of variables, such as which of the intercepting pins the strand depends from, the stiffness of the product, the height of the underlying coil, etc. For example, the connecting strand may be located in one corner of the restricted area as at S', in which case a danger exists that the strand will be jammed further into the corner when blade 58 is advanced. Another undesirable condition is indicated at S" where the strand extends through the restricted area 92 at an angle approaching the horizontal. This condition may result in the strand being jammed between the cutting blade 58 and the guide surfaces adjacent to the path blade travel.

To avoid the above-mentioned difficulties, the movable blade holding element 56 is further provided with two guide members 114 and 116. Guide member 114 consists basically of a horizontally disposed plate overlying the cutting blade 58 at a level immediately above the pivotal arm member 68. Guide member 114 is provided with a forward edge 118 which extends in a generally diagonal direction relative to the transverse cutting edge of the underlying shear blade 58. Guide member 114 is supported on an upstanding pedestal 120 which is secured to the knife holding element 56 by means of bolts 122a, the latter also cooperating with bolts 122b to secure member 124 to the underside of the knife holding element. A plate 126 is attached to the underside of member 124, the other guide member 116 being mounted on one side of plate 126 exterior of the member 52b depending from the overlying plate 44. Guide member 116 is comprised basically of an upstanding block having an inwardly and downwardly sloping front surface 128. The upper edge 130 of guide member 116 lies in a plane immediately below that containing the lower surface of gate 66.

In view of the foregoing, it will now be evident that the blade holder 56, blade 58, and guide members 114 and 116 are combined in a single assembly (hereinafter referred to as the "movable blade assembly 132" which is movable into and out of the chamber 14 through the opening 64 in the chamber wall 12.

Figure 13:
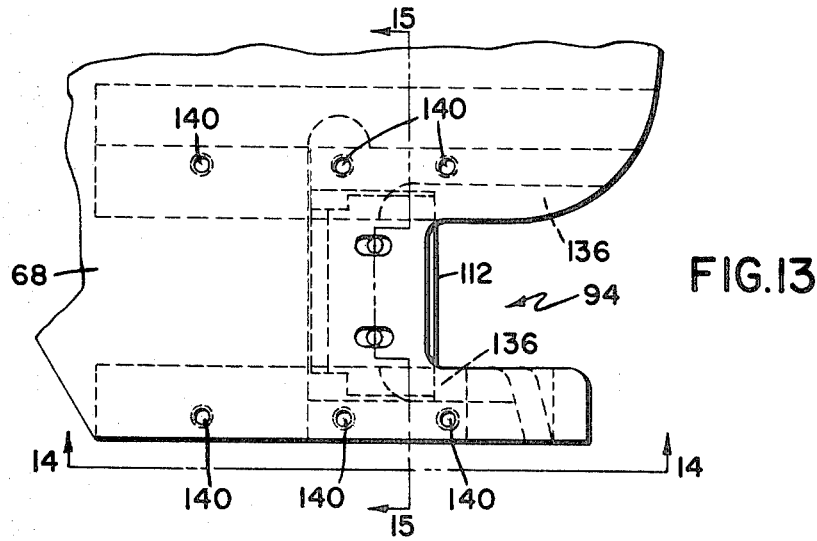
FIG. 13 is an enlarged plan view of the cutting notch on the pivotal arm member.
Figure 14:
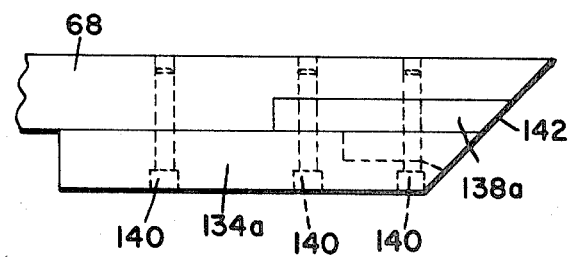
FIG. 14 is an end view taken along line 14—14 of FIG. 13.
Figure 15:
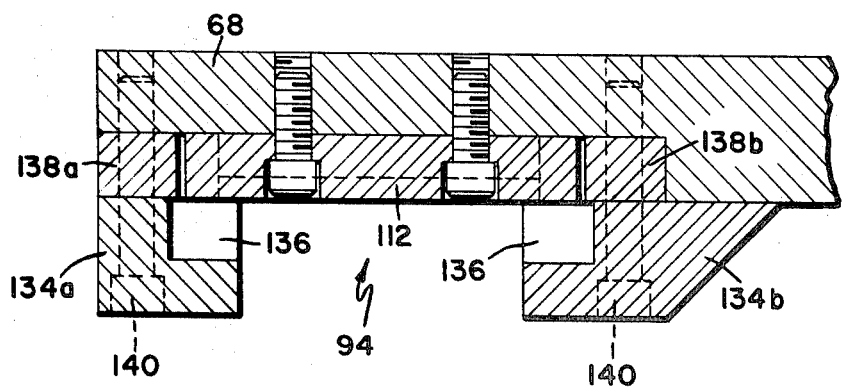
FIG. 15 is a sectional view taken along line 15—15 of FIG. 13.

Referring now to FIGS. 13–15, it will be seen that the pivotal arm member 68 adjacent cutting notch 94 is provided, in addition to cutting blade 112, with guide members 134a and 134b defining grooves 136 arranged to accept and guide the blade 58 on movable blade assembly 132 when the latter is moved into chamber 14 during a shearing operation. The guide members 134a and 134b are spaced from the underside of arm member 68 by fillers 138a and 138b, and the guide members and fillers are held in place by bolts 140. As is best seen in FIG. 14, the forward edges of the arm member 68, filler 138a and guide member 134a are inclined downwardly and inwardly to collectively present a front surface 142 which slopes in a direction opposite to that of the front surface 128 on guide member 116.

Once the connecting strand S is confined within the restricted area 92 and the locking pin 106 is engaged, the shearing operation may begin. As previously mentioned, strand S may assume any one of a number of different positions and attitudes. When the strand is ideally located in a substantially vertically disposed position as indicated by the solid lines at S in FIGS. 6 and 7, the movable blade assembly 132 will enter the chamber 14 through opening 64 and the strand will be severed by the cooperative action of blades 58 and 112. Under these ideal conditions, no complications are encountered and accordingly, there is no need for auxiliary guide members.

Figure 6:
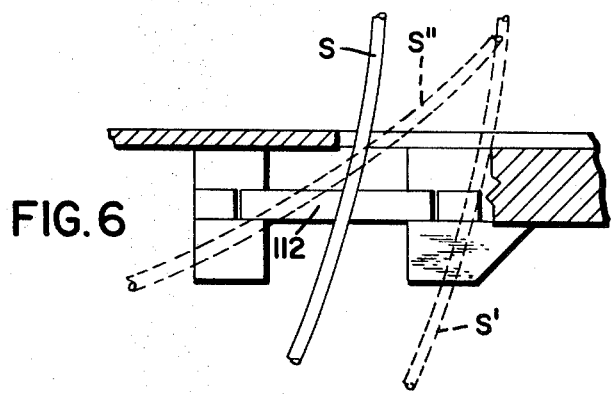
FIGS. 6 and 7 are vertical sectional and plan views, respectively, which schematically illustrate some of the attitudes and positions that the connecting strand may assume after the intercepting pins, pivotal arm member and gate member have been operatively positioned.
Figure 7:
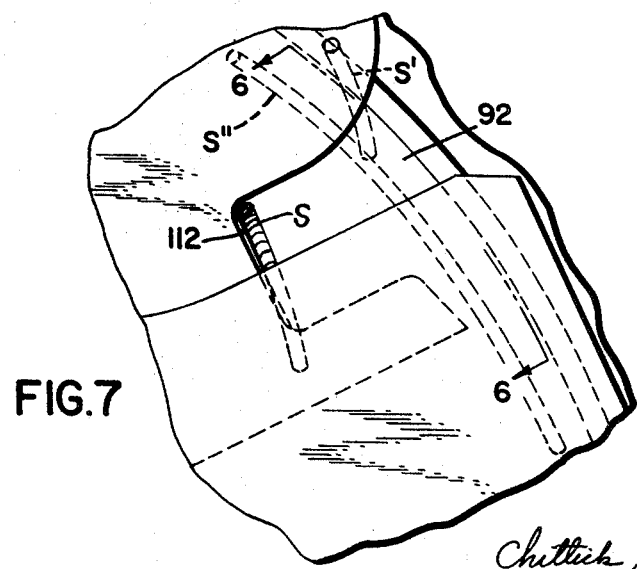
Figure 8:
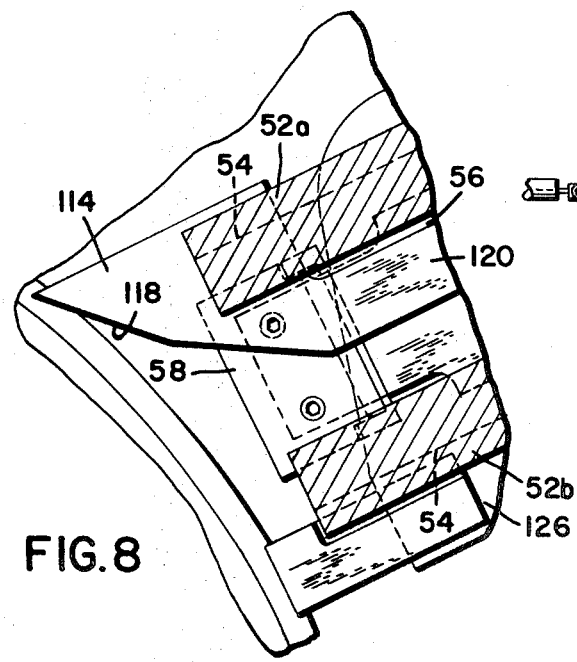
FIG. 8 is a sectional view taken along line 8—8 of FIG. 3.

When, however, the connecting strand is positioned in one corner of the restricted area as indicated at S' in FIGS. 6 and 7, a different operational sequence involving guide member 114 takes place. More particularly, and with reference additionally to FIG. 16, it can be seen that when the movable blade assembly 132 is advanced, the strand S' is initially engaged by the diagonally extending forward edge 118 of guide member 114 as at 144. As blade 58 moves towards blade 112, the strand is progressively shifted by guide member 114 along the edge 146 of the cutting notch 94 to the corner 148 and then along the edge of blade 112 to a position as at 150, at which point the strand is ideally positioned in preparation for the cut which now takes place by virtue of the cooperative action of blades 58 and 112.

A somewhat different sequence of operation takes place when the connecting strand slopes gradually through the restricted areas as shown at S'' in FIGS. 6 and 7. Under these conditions, as shown in FIGS. 17 and 18, the diagonally extending forward edge 118 of guide member 114 again contacts the strand as at 152. At approximately the same time, however, the strand is contacted at another point as at 154 (see FIGS. 17 and 18) by the inclined front face 128 of guide member 116. As the movable blade assembly 132 continues to move forward into chamber 14, the guide member 114 pushes the strand along the edge 146 of the cutting notch towards blade 112. At the same time, the inclined face 128 of guide member 115 cooperates with the oppositely inclined laterally disposed surface 142 on arm 68 and as guide member 116 continues to advance, the strand is contacted between both inclined surfaces 128 and 142 and pushed downwardly in the direction indicated by arrow 156. The combined action of guide member 114 and the cooperating surfaces 128 and 142 thus pushes the strand against cutting blade 112 while simultaneously effecting a twisting action in a counterclockwise direction as schematically depicted in FIG. 20. This in turn results in the strand again being positioned against blade 112 in a substantially vertical position as indicated in dotted lines at 158 in FIG. 19 prior to the shearing action taking place.

After the connecting strand S has been severed, the movable blade assembly 132 is retracted, locking pin 106 is withdrawn, and the gate member 66 and arm 68 retracted to their inoperative positions. At the same time, sail 30 is retracted from the underlying coil 28, and a pusher mechanism 160 is employed to push the coil onto a position indicated in dotted lines at 28a on the adjacent conveyor 38. Once this has been accomplished, the sail 30 is again elevated and the intercepting pins 32a, 32b and 32c are retracted, thus allowing the rings to again drop onto the collecting table 26.

In view of the foregoing, it can now be seen that the present invention consists of a means for insuring proper alignment and positioning of the connecting strand S between the shear blades 58 and 112 regardless of the position of the strand immediately after the intercepting pins 32a, 32b and 32c have been actuated. In the preferred embodiment herein illustrated, this is accomplished by employing locating means in the form of a gate member 66 and pivotal arm member 68 to initially locate the strand within a restricted cross-sectional area 92 of the chamber 14. Thereafter, by employing guide means including one or both of the guide members 114 and 116 in cooperation with adjacent guide surfaces on the gate member and pivotal arm member, proper positioning of the strand is assured prior to the actual shearing operation taking place between cutting blades 58 and 112. This type of arrangement avoids the possibility of a connecting strand becoming jammed and thus greatly improves the reliability of the shearing operation.

It is my intention to cover all changes and modifications to the embodiments herein disclosed which do not depart from the spirit and scope of the invention.

I claim:

1. Apparatus for dividing a descending helical formation of rings comprising: a wall member defining a chamber through which the rings descend vertically; intercepting means for temporarily interrupting the descent of rings through said chamber, the rings above said intercepting means being connected to the rings below said intercepting means by a connecting strand; locating means below said intercepting means for confining the connecting strand within a restricted area of said chamber adjacent to said wall member; a first cutting edge on said locating means; a second cutting edge movable into said restricted area to cooperate with said first cutting edge in shearing the connecting strand; and, guide means movable with said second cutting edge, said guide means cooperating with said locating means to position the connecting strand between said cutting edges prior to commencement of the shearing operation.

2. The apparatus as claimed in claim 1 wherein said locating means includes a gate member movable through said wall member from an inoperative position exterior of said chamber to an operative position extending across the path of ring descent, the forward edge of said gate member when thus operatively positioned being spaced from the interior of said wall member.

3. The apparatus as claimed in claim 2 wherein said locating means is further characterized by an arm member pivotally movable through an opening in said wall member from an inoperative position exterior of said chamber to an operative position extending into said chamber beneath said gate member, the said operatively positioned gate member and arm member cooperating with said wall member to define the said restricted area of said chamber.

4. The apparatus as claimed in claim 3 wherein said gate member is operatively positioned subsequent to the operative positioning of said intercepting means and prior to the operative positioning of said arm member, the operative positioning of the gate member thus causing the connecting strand to be initially located in the space between the forward edge of said gate member and said wall member, whereupon subsequent operative positioning of said arm member will cause the connecting strand to be located within the said restricted area.

5. The apparatus as claimed in claim 4 further characterized by the forward edge of said arm member bordering said restricted area being provided with a notch with the said first cutting edge positioned at the base of said notch.

6. The apparatus as claimed in claim 5 wherein said guide means includes a first guide member positioned at a level above that of said arm member, the forward edge of said first guide member being disposed at an angle relative to the direction of movement of said second cutting edge, the arrangement of said first guide member being such that a connecting strand contacted thereby will be forced along the forward edge of said arm member into the base of said notch prior to said strand being sheared by said cutting edges.

7. The apparatus as claimed in claim 6 wherein said guide means further includes a second guide member disposed below and laterally of said first guide member, said second guide member having an inclined forward surface cooperating with an oppositely inclined surface on said arm member to force a section of the connecting strand contacted therebetween downwardly relative to said first guide member.

8. Apparatus for dividing a descending helical formation of product rings, said apparatus comprising: a wall member defining a chamber through which the helical formation of rings descends vertically; intercepting rings movable into the path of ring descent to temporarily interrupt the further descent of rings through said chamber, the rings above said intercepting means being connected to the rings below said intercepting means by a connecting strand; a gate member movable across said chamber at a level beneath that of said intercepting means, the leading edge of said gate member cooperating with said wall member to define a space through which the connecting strand extends; an arm member movable relative to said wall member and below said gate member, the leading edge of said arm member cooperating with said wall member and the leading edge of said gate member to define a restricted area through which the connecting strand is confined; a notch in the leading edge of said arm member, a first cutting edge at the base of said notch; a second cutting edge movable through said wall member and across said restricted area, said first and second cutting edges cooperating to sever the strand extending through said restricted area; and, guide means movable with said second cutting edge, said guide means cooperating with the leading edges of said gate member and said intercepting means to insure that the connecting strand is substantially vertically positioned at the base of said notch prior to the said strand being severed by said cutting edges.

9. The apparatus as claimed in claim 8 wherein said guide means is comprised of a first guide member positioned at a level above that of said gate member, the disposition of the forward edge of said first guide member relative to the forward edge of said arm member being such that a connecting strand contacted by the forward edge of said first guide member will be pushed along the forward edge of said arm member and into said notch during advancement of said second cutting edge towards said first cutting edge.

10. The apparatus as claimed in claim 9 wherein said guide means is further characterized by a second guide member, said second guide member having an inclined forward surface cooperating with an oppositely inclined surface on said arm member to push a connecting strand contacted therebetween downwardly as the second cutting edge is advanced towards the first cutting edge.

References Cited
UNITED STATES PATENTS 3,360,842   1/1968   Hill et al. _____ 29—200

THOMAS H. EAGER, Primary Examiner